A. C. LINDGREN.
SEED DISCHARGING MECHANISM.
APPLICATION FILED NOV. 13, 1912.
1,064,842.
Patented June 17, 1913.
2 SHEETS—SHEET 1.
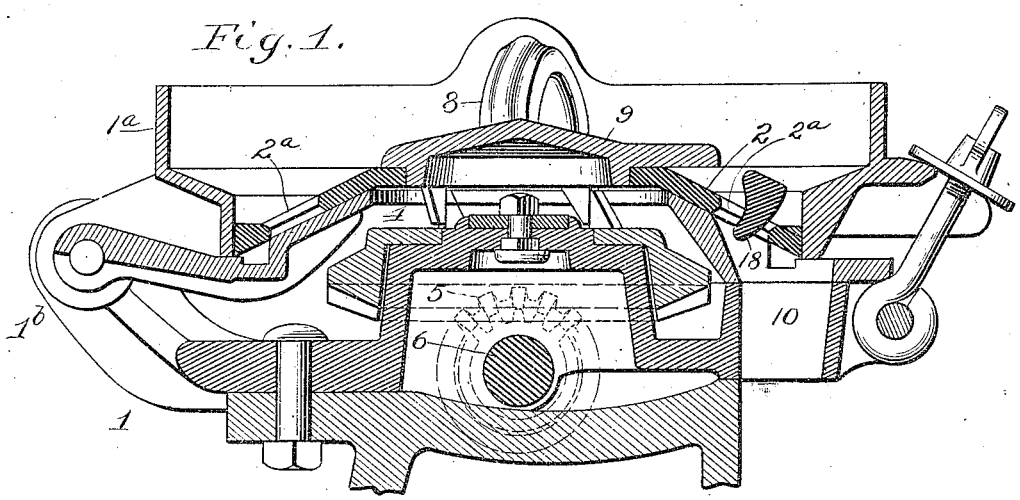
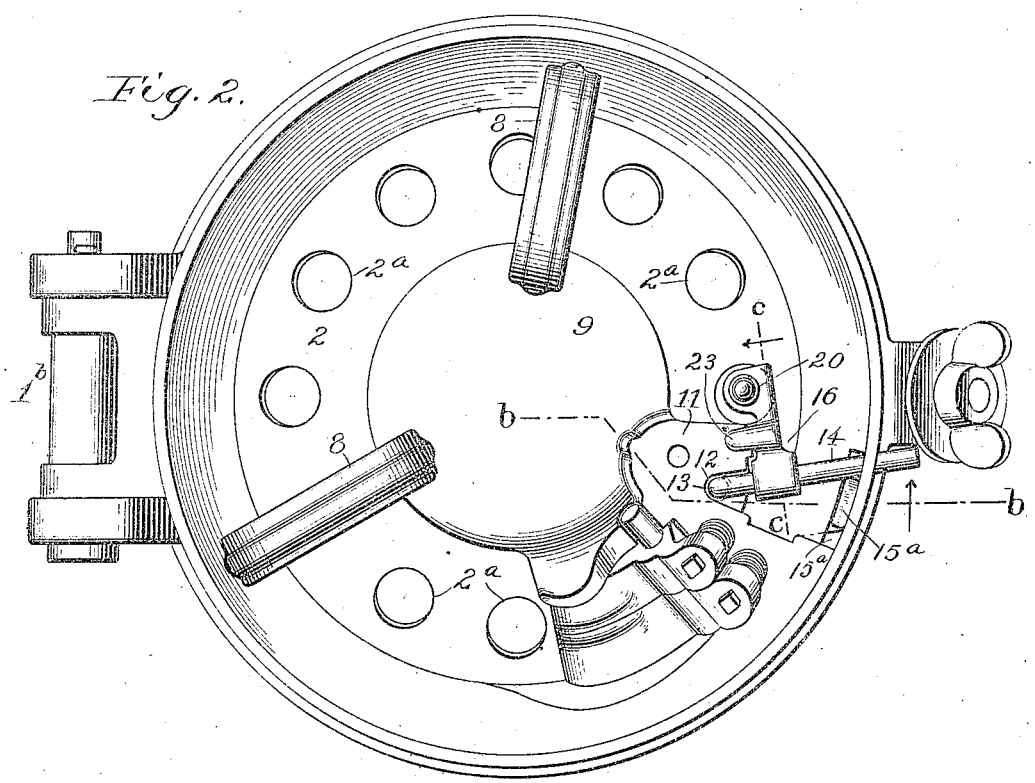
Witnesses:
Inventor
A. C. Lindgren
By his Attorneys
Rogers Kennedy & Campbell

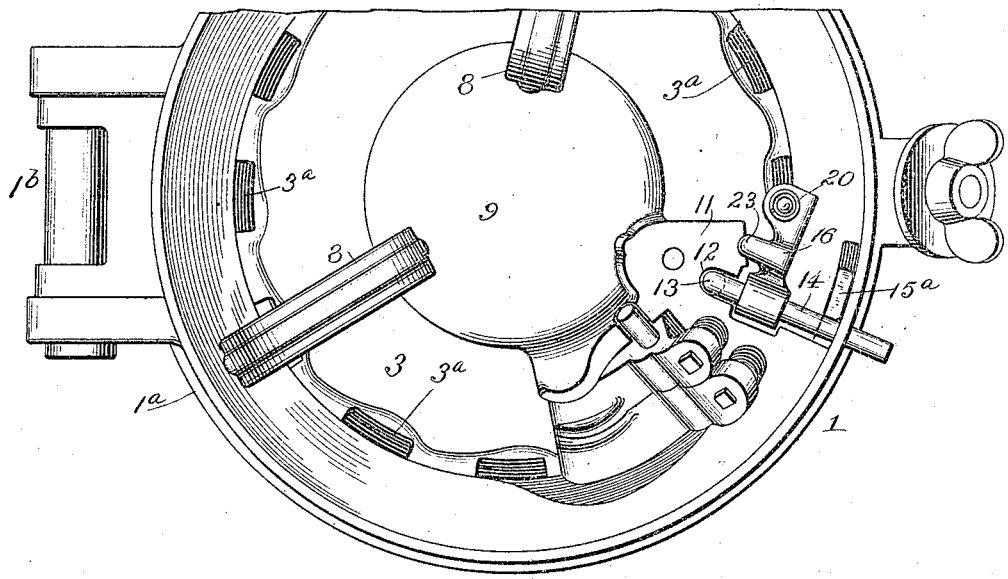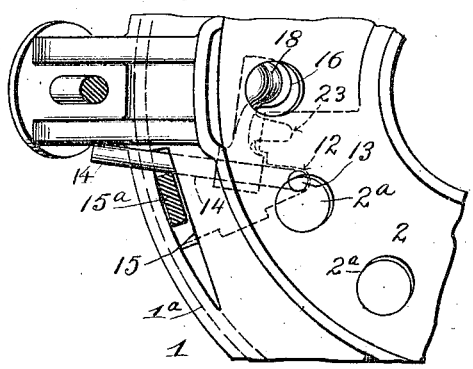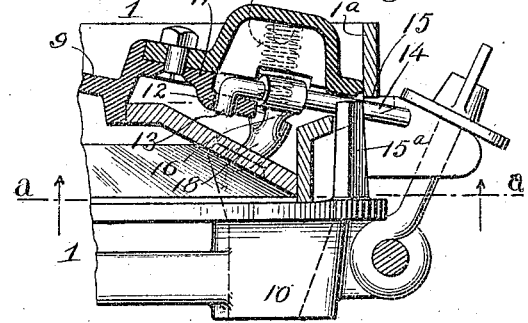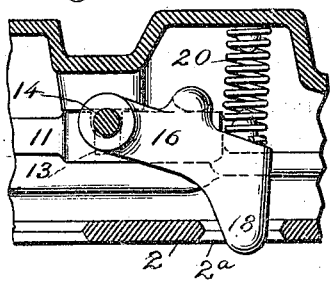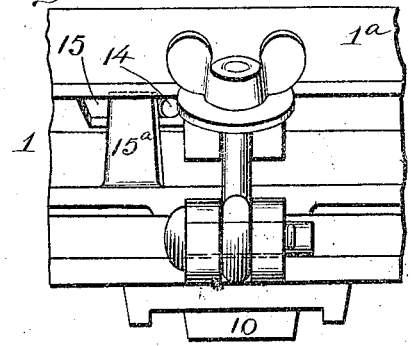

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

SEED-DISCHARGING MECHANISM.

1,064,842. Specification of Letters Patent. Patented June 17, 1913.

Application filed November 13, 1912. Serial No. 731,158.

*To all whom it may concern:*

Be it known that I, ALEXUS C. LINDGREN, a citizen of the United States, residing at Moline, in the county of Rock Island and State of Illinois, have invented certain new and useful Improvements in Seed-Discharging Mechanism, of which the following is a specification, reference being had therein to the accompanying drawing.

This invention relates to seed discharging mechanism, and has reference more particularly to that type of mechanism used for planting corn, and comprising a can or hopper having in its bottom a rotary seed dropping plate containing seed cells to receive the kernels from the overlying mass of seed in the hopper, and operating by its rotation to carry the kernels in succession over a discharge opening in the bottom of the hopper, through which they are discharged.

It is the common practice to employ dropper plates of different forms for different kinds of planting, one form of plate having closed circular seed cells in which the kernels are carried on their side to the point of delivery; and another form of plate having open notches in its periphery constituting "edge" cells in which the kernels are carried on edge to the point of delivery, these plates being interchangeable so that one or the other may be employed in the discharging mechanism as desired. In connection with rotary seed plates of these types, knocker devices are employed, which overlie the plates so as to operate in conjunction with the cells therein, the function of the knocker devices being to insure the certain discharge of the kernels from the cells. By reason of the fact that the open edge cells are farther from the center of the plate than the closed circular cells, it is customary when the plates are changed, to also change the knocker device so that it will occupy its proper relation to the cells of the different plates. This necessity for a change of the knocker devices is objectionable for many reasons, mainly because it entails a waste of time in making the change, and requires that special parts be kept on hand; and further, there is danger of loss or displacement of such parts.

In a patent issued to me August 15th, 1911, No. 1,000,683, is disclosed an improved form of knocker device mounted movably so that when in one position, it will act in connection with the round cells in one form of plate, and when in another position it will operate in connection with the edge cells in a different form of plate, the employment of such a knocker device overcoming the objections attendant upon the use of different knockers for the different forms of plates. In this patent the knocker device was in the form of a finger so mounted and sustained that it was free to shift in position, no means being provided for retaining the knocker in its adjusted position, so that there was a liability of the knocker, when operating in connection with the cells of one form of plate, to accidentally shift out of operative relation to the cells.

It is the aim of the present invention to avoid this liability of the knocker becoming displaced, and the invention consists broadly in means for retaining the knocker in the position in which it may be set to coöperate with the cells of a particular plate.

In its more specific embodiment the invention comprehends the employment of a knocker carrier on which the knocker is mounted, the said carrier being of such form and so arranged that by moving the same, it will positively shift the knocker to one of its operative positions from the other, and when so shifted will act to retain the knocker in its shifted position.

In the accompanying drawings: Figure 1 is a vertical sectional elevation taken centrally through Fig. 2, showing the seed discharging mechanism and its driving parts, with my invention embodied therein. Fig. 2 is a top plan view of the same, showing the mechanism equipped with a dropper plate having round or flat cells, the covering casing for the knocker device being removed. Fig. 3 is a similar view showing the mechanism equipped with a dropper plate having edge cells. Fig. 4 is a bottom plan sectional view of the parts shown in Fig. 2 on the line *a—a* of Fig. 5. Fig. 5 is a transverse sectional elevation taken on the line *b—b* of Fig. 2. Fig. 6 is a sectional elevation on the line *c—c* of Fig. 2. Fig. 7 is an elevation showing the means for locking the knocker device in position.

Referring to the drawings, the seed discharging mechanism is mounted and sustained in any suitable manner in the bottom or frame member 1, of a can or hopper (not shown), and includes a rotary seed distributing plate which may be either of the form indicated by the numeral 2 in Fig. 2, with circular closed seed cells 2ª arranged at intervals near its periphery, in which the kernels are carried on their side; or it may be of the form indicated by the numeral 3 in Fig. 3, with open edge cells 3ª in its periphery, in which the kernels are carried on edge. The dropper plates are removable from the mechanism and interchangeable so that one or the other may be used as desired, and they are mounted and rotated in any suitable manner. In the present instance the plate is seated loosely on a ring-like guiding plate 4, constituting a part of the frame member and provided on its under side with bevel gear teeth engaged by a bevel gear 5, on a driving shaft 6. Surrounding the dropper plate, the frame member extends upwardly in the form of a ring 1ª, to which the lower edge of the hopper is adapted to be fixed, and carried by this ring by means of radial arms 8, is a central cover plate 9, which overlies the center of the seed plate, leaving its outer edge, in which the cells are formed, exposed, so that the mass of seed in the hopper will rest on the exposed portion of the dropper plate and will be caused to enter the cells therein as the plate is rotated, the result being that the kernels will be carried by the plate and discharged in succession through a discharge opening 10, in the bottom of the hopper. On one side and adjacent the discharge opening, the cover plate has projecting from it a bracket arm 11, having at its outer end a vertical socket 12, receiving loosely a vertical finger 13 on the inner end of a rod 14, which latter extends outwardly through a slot 15 formed in the ring 1ª, and has its outer end exposed on the outer side of the frame member, the construction being such that the rod may be shifted relatively to the bracket in a circumferential direction, turning at its inner end on a vertical axis coincident with the finger 13. This rod thus mounted constitutes a knocker carrier shiftable in position circumferentially in the slot 15. 16 represents a knocker device consisting of a finger mounted loosely at one end on the rod 14, and having at its opposite end a depending nose 18 adapted to enter the cells in the plates as the plates are rotated and to dislodge any kernels that will not readily leave the cells. A spring 20 is seated between the upper side of the finger and the under side of the cap plate, and acts to hold the finger down yieldingly. It is seen from this construction that the knocker is carried by the knocker carrier in such manner that when the knocker carrier is shifted, for instance from the position shown in Fig. 3, where the knocker coöperates with the edge cells, to the position shown in Fig. 2, the operative end of the knocker will move inwardly toward the center of the plate, in which position it will coöperate with the circular cells of the other form of plate. When, therefore, a plate with round cells, as shown in Fig. 2, is employed, the knocker finger will occupy its inner position and its nose will, as the plate is rotated, enter the cells in succession, and engaging the kernels therein, will dislodge them and insure that they will leave the cells and pass out through the discharge opening in the hopper. When a dropper plate of the form shown in Fig. 3 is employed, which dropper plate is provided in its periphery with open edge cells, these cells being at a greater distance from the center than the round cells, an outward shifting of the knocker is required in order that its nose shall coöperate with the edge cells. This outward shifting of the finger is effected by shifting the knocker carrier circumferentially to the position shown in Fig. 3, the result being that the active end of the knocker device will be swung outwardly so as to coöperate with the edge cells.

Any suitable device or means may be employed to retain the knocker carrier in its different shifted positions, but I prefer to adopt for this purpose a fixed stop finger 15ª extending vertically upward from the lower portion of the frame member 1, on which member the seed plate rests. The ring portion 1ª of the frame member carrying the hopper or can, is hinged as at 1ᵇ to the lower portion, which, with the hopper, may be swung up and back to expose and permit the interchange of the seed plates, and the relation of the stop finger to the ring member is such that when the ring member is down in horizontal operative position confining the plate, the stop finger will extend through the slot 15 before alluded to, and will occupy a central position therein. In this position there will be left free spaces at the opposite ends of the slot, through which the rod 14 of the knocker carrier may respectively extend when the knocker carrier is in its different shifted positions, and the finger will hold the rod in such positions. In order to shift the knocker carrier, therefore, from one position to another to effect the corresponding adjustments of the knocker, according to the particular plate for the time being in use, it will first be necessary to swing the ring member 1ª upwardly to free the stop finger from the slot, after which the knocker carrier may be shifted to its other position to correspondingly change the position of the knocker for the changed form of plate. The construction described constitutes an effective and reliable means for retaining the knocker carrier in its adjusted positions, as it will be necessary before the knocker carrier can be changed in position, to swing the can back to an inoperative position. Manifestly there will be no liability of the knocker becoming displaced when in action with a particular form of plate.

In order that in changing the plates, the knocker will be prevented from falling below its normal position and thereby becoming displaced, I provide the knocker finger with an inwardly extending lug 23, which is adapted to engage the upper side of the bracket arm and thus prevent the knocker finger from descending to an undue point. It will be understood, of course, that the relation of the lug to the finger and the bracket arm is such that the knocker finger will be permitted its full operative movements when in action, without interference from the lug, to dislodge the kernels.

From the foregoing description it will be seen that means are provided for retaining the knocker in its different positions to coöperate respectively with either form of plate, so that there will be no liability of the accidental shifting of the knocker out of operative relation to the particular form of plate for the time being in use.

In the accompanying drawings I have shown my invention in the form which I prefer to adopt, and which in practice has been found to answer to a satisfactory degree the ends to be attained; but it will be understood that the details may be variously modified without departing from the spirit of my invention, provided the operation is substantially as indicated above; and it will be further understood that the invention is not limited to any particular form or construction of the parts except in so far as such limitations are specified in the claims.

Having thus described my invention, what I claim is:

1. In a seed discharging mechanism, the combination of a frame member, a rotary seed dropping plate provided with seed cells, a movable knocker-carrier sustained by the frame member, and a knocker movably mounted on said carrier.

2. In a seed discharging mechanism, the combination of a frame member, a rotary seed dropping plate provided with seed cells, a swinging knocker-carrier sustained by the frame member, and a knocker movably mounted on said carrier.

3. In a seed discharging mechanism, the combination of a frame member, a rotary seed dropping plate provided with seed cells, an adjustable knocker-carrier sustained by the frame member, and a knocker mounted on said carrier.

4. In a seed discharging mechanism, the combination of interchangeable rotary seed dropping plates provided with seed cells, a knocker movable toward and from the edges of the plates, and means for retaining the knocker in its different positions relative to the edges of the plates.

5. In a seed discharging mechanism, the combination of a frame member, interchangeable rotary seed dropping plates provided with seed cells, a knocker shiftable toward and from the edges of the plates, and shifting means connected with the knocker and exposed on the outer side of the frame member.

6. In a seed discharging mechanism, the combination of a frame member, interchangeable rotary seed dropping plates provided with seed cells, a knocker-carrier pivoted to the frame member on an upright axis, and a knocker pivoted to the carrier on a horizontal axis.

7. In a seed discharging mechanism, the combination of a frame member, interchangeable seed dropping plates provided with seed cells differing in the two plates in respect to their distance from the center of the plate, a knocker device movable laterally toward and from the center of the plate, and a knocker-carrier on which said knocker is mounted, said carrier being adjustable to set the knocker so that it will coöperate with the cells in either plate as desired.

In testimony whereof I affix my signature in presence of two witnesses.

ALEXUS C. LINDGREN.

Witnesses:
S. C. BLANDING,
JAMES J. LAMB.

---

Copies of this patent may be obtained for five cents each, by addressing the "Commissioner of Patents, Washington, D. C."